United States Patent [19]

Peterson et al.

[11] Patent Number: 5,467,914
[45] Date of Patent: Nov. 21, 1995

[54] METHOD AND APPARATUS FOR FLUXING AND SOLDERING TERMINALS ON A PRINTED CIRCUIT BOARD

[75] Inventors: John P. Peterson, Chapel Hill; Paul Brinkley, Morrisville, both of N.C.

[73] Assignee: Northern Telecom Limited, Montreal, Canada

[21] Appl. No.: 345,470

[22] Filed: Nov. 21, 1994

[51] Int. Cl.⁶ .............................. B23K 1/20; B23K 31/02
[52] U.S. Cl. ...................... 228/102; 228/180.1; 228/223; 228/37
[58] Field of Search .................... 228/223, 37, 180.1, 228/102, 105, 9

[56] References Cited

U.S. PATENT DOCUMENTS 3,112,723  12/1963  Potocki ................................ 228/180.1
4,871,105  10/1989  Fisher et al. ............................ 228/37

Primary Examiner—Kurt Rowan
Assistant Examiner—Jeffrey T. Knapp
Attorney, Agent, or Firm—Foley & Lardner

[57] ABSTRACT

Fluxing and soldering terminals on a printed circuit board in an in-line process in which a wall of flux is directed against a surface of the board which moves in inclined manner as it passes through a fluxing station and towards a soldering station. The process controls flux application to decrease the amount of flux applied from the leading end to the trailing end of the board, the board inclination resulting in flow of flux to redistribute it towards providing a constant flux thickness for the soldering step. Particularly useful for processes involving "no-clean" flux application where residual flux after soldering is to be avoided because of potential electrical problems.

11 Claims, 3 Drawing Sheets

METHOD AND APPARATUS FOR FLUXING AND SOLDERING TERMINALS ON A PRINTED CIRCUIT BOARD

This invention relates to methods and apparatus for fluxing and soldering terminals on a printed circuit board.

In the manufacture of printed circuit boards in which soldering at terminals positions on the boards is performed by known wave soldering techniques in an in-line process, soldering flux is sprayed onto the boards' undersurfaces in a fluxing station, the boards then proceeding through at least one preheating station before being subjected to the solder wave. Quality control of such a process is essential not only to maintain required competitive quality of the final product, but also to minimize wastage which may be extremely expensive to the board manufacturer. It is known with any particular fluxing and soldering apparatus, any fluxing or soldering variation which develops is inclined to be repetitive. Hence, after development of the variation, all boards made by the apparatus will have similar specific defects which will not be corrected on further boards until the variation in the process has been corrected. The design and operation of the apparatus may be such that some operational variation may not cause products to be commercially acceptable, but in other cases operational variation will more certainly cause failure to obtain commercial acceptance. Failure may be caused by control in application of flux onto the surface of a board, i.e. too little or too much flux applied in certain areas, which may have an effect on the final soldering operation or upon the surface insulation resistance (SIR) of the finished circuit board. This is particularly the case in the use of a wave soldering operation in printed circuit board manufacture in which flux is applied to boards moving in an upwardly inclined direction in series towards a wave soldering station. An attempt is made generally to influence the quantity of flux applied to each particular board, but in being transported into the wave soldering station, and dependent upon the orientation of each board, flux distribution may change.

The present invention seeks to provide a method and apparatus for fluxing and soldering terminals on a printed circuit board in which the above problems are minimized.

Accordingly, the present invention provides according to one aspect, a method of fluxing and soldering terminals on a printed circuit board comprising: moving the printed circuit board along a passline through a flux application station; directing a wall of flux across a surface of the board as it moves through the flux application station while decreasing in controlled manner the flow rate of the flux directed at the board surface until the board has passed completely through the wall of flux whereby the thickness of flux upon the board surface decreases from a leading end to a trailing end of the board; moving the printed circuit board out of the flux application station and in an upwardly inclined manner towards a solder application station thereby causing the flux to flow towards the trailing end of the board and redistribute the flux towards providing a constant flux thickness over the board; and then moving the board through the solder application station to apply solder to the terminals.

It has been found that with conventional methods, flux applied to a printed circuit board surface in a wave soldering process tends to flow downwardly on the surface towards the trailing end of the board as the board is moved towards the solder application station. This may produce less flux than is required at the leading end of the board, an increase in flux towards the trailing end and perhaps more flux than is needed at the trailing end. Because of the lack of uniformity in flux application, soldered joints may not be up to the required standard and in the case of 'no clean' fluxes used more recently, problems concerning surface insulation resistance of a printed circuit board may result. In use of the method according to the invention defined above, reduction in the flow rate of the flux from the leading to the trailing end of the board serves to counteract this tendency. As a result, and taking into account the tendency of flux flow towards the trailing end of the board, the desired maximum flow rate essentially should apply more flux than is actually required at the leading end and the desired minimum flow rate essentially should apply less than is required at the trailing end. Preferably, the flux flow rate is decreased progressively from its desired maximum to its desired minimum, but alternatively incremental steps in flow rate reduction are also advantageous.

The invention also includes a method of fluxing and soldering terminals on a plurality of printed circuit boards moving in series along a passline through a flux application station and then through a solder application station, the method comprising: directing a wall of flux across a surface of each board in turn as it moves through the flux application station with a leading end of the printed circuit board moving into the wall of flux so that the wall of flux is directed along the printed circuit board from its leading end to a trailing end of the board and while simultaneously decreasing in controlled manner, from a desired maximum, the flow rate of the flux being applied to the board whereby the thickness of flux upon the board surface decreases from its leading end to the trailing end of the board; moving each board out of the flux application station and, to complete a flux flow rate cycle, increasing the flow rate of the flux to a desired maximum after each board is moved out of and before the leading end of the next succeeding board moves into the flux application station; after each board has moved out of the flux application station, moving the board in an upwardly inclined manner towards a solder application station thereby causing flux to flow towards the trailing end of the board to redistribute the flux towards providing a constant flux thickness over the board; and then moving the board through the solder application station to apply solder to the terminals.

The flow of flux may be controlled to operate in various ways. The rate of flow of flux may be decreased to a minimum which is maintained until a next succeeding board approaches the flux application station, the flux flow then being increased to its maximum. Alternatively, after the passage of each board through the flux application station, the flow of flux may be reduced to zero pending the approach of a succeeding board towards the flux application station. With the use of the latter method, there may be a saving in flux lost in being dissipated from the wall when directed at a space between two boards in the series and also in the case where a succeeding board is a substantial distance behind the previous board.

Ideally, to control the process each printed circuit board, as it approaches the flux application station, is sensed by a sensing means and the sensing means controls the flow rate of the flux into the wall so as to increase the flow rate to its desired maximum before the leading end of the printed circuit board reaches the flux application station.

In addition, the invention also includes a wave soldering apparatus comprising: a flux application station and a solder application station disposed downstream of the flux application station along a passline for printed circuit boards to be passed through the apparatus; means for creating a wall of flux in the flux application station and for directing it upwardly towards the passline to coat, with flux, printed circuit boards as they move through the flux application station; and means for controlling the flow rate of the flux into the wall whereby the flow rate decreases from a desired maximum as the leading end of a printed circuit board enters the wall until the board has passed completely through the wall.

Embodiments of the invention will now be described, by way of example, with reference to the accompanying drawings, in which:

FIG. 1, relating to a first embodiment, is a diagrammatic side elevational view of a wave soldering apparatus showing printed circuit boards being fed therethrough;

Figure 1:
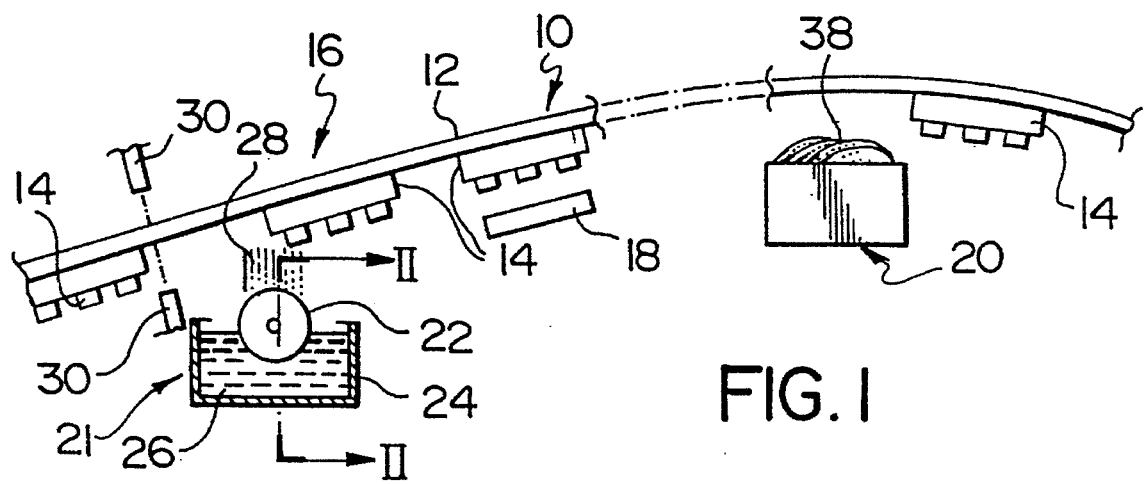

In the embodiment as shown in FIG. 1, a wave soldering apparatus 10 is basically of conventional construction in that it has an inclined conveyor 12 moving upwards from left to right in the Figure for conveying printed circuit boards 14 through a flux application station 16, past preheaters 18, and then through a wave soldering application station 20.

In addition, the apparatus comprises a means 21 for creating a wall of flux in the flux application and for directing the flux upwardly against an undersurface of each board as it moves along the conveyor 12. The means 21 comprises a conventional rotary perforate drum 22 entering into a bath 24 so as to be partially submerged in flux material 26 contained in the bath. In practice, with the printed circuit boards fed in series along the conveyor 12, the drum 22 is rotated and with pressurized air being fed into the drum, flux material contained upon the drum is driven from the drum in an upward direction by the pressurized air issuing through the perforations to create the wall 28 of flux as shown diagrammatically in FIG. 1.

Figure 2:
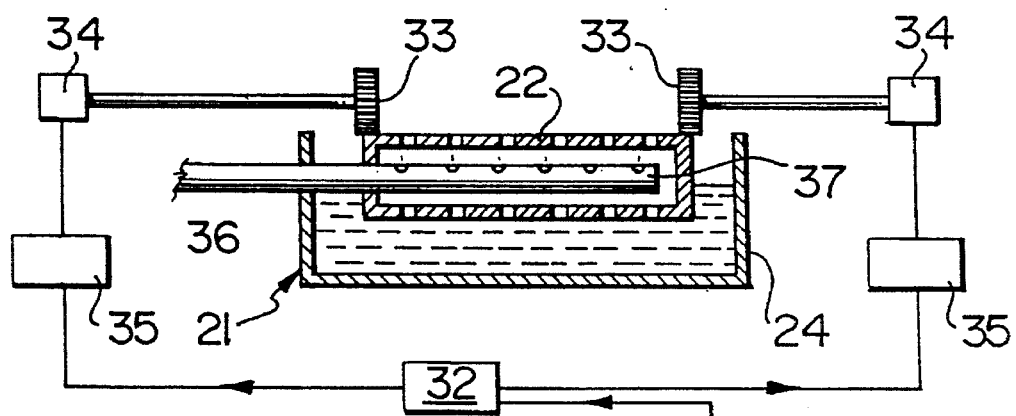
FIG. 2 is a diagrammatic view partly in cross-section along line II—II in FIG. 1 of part of the apparatus of the first embodiment.

The apparatus 10 of the first embodiment differs from the conventional apparatus in that it has, in accordance with the invention, means for controlling the rate of flow of the flux into the wall. The control for the flow rate enables the flow rate to decrease from a desired maximum as the leading end of a printed circuit board enters the wall until the board has passed completely through the wall. The control means comprises a sensor for sensing when the leading end of each board gets to a certain position as it approaches the flux application station so as to enable the flux to be turned up to its maximum rate of flow preparatory to the leading end reaching that station. As shown in FIGS. 1 and 2 the sensor comprises an optical sensor 30 which sends a signal to a computer 32 upon being triggered by the leading end of a board 14. The drum 12 is rotated at its two ends by gears 33 driven by motors 34. The computer controls the operation of each motor 34 through a potentiostat 35. Upon receiving the signal from sensor 30, the computer then operates the two potentiostats simultaneously so as to increase drum rotation to a maximum consistent with a desired maximum flow rate of the flux in the wall at the position to be occupied by the undersurface of the printed circuit board as it passes through the flux application station. The computer then operates through the potentiostats to ensure that the motors 34 drive the drum 12 at a progressively decreasing speed whereby the flow rate of the flux into the wall 28 at the location of the board undersurface also decreases in a desired manner. This decrease in flow rate continues until at least the trailing edge of a printed circuit board has passed outwardly beyond the wall so that the whole of the board has now been coated with flux on its under surface. In conventional manner the drum 12 is fed with compressed air from an air knife 37 in the drum supplied by an air pipe 36.

Figure 3:
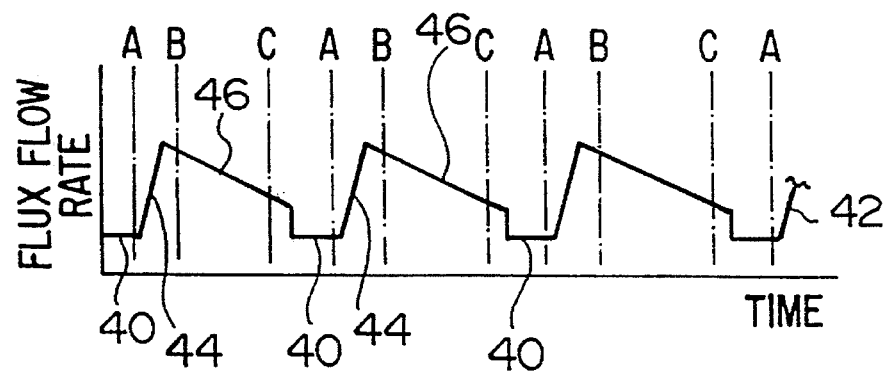
FIG. 3 is a graph showing the control of flux application to printed circuit boards being fed through the apparatus.

In operation of the apparatus of the first embodiment and with reference to FIGS. 1 and 2 and also particularly to FIG. 3, at commencement of operations the solder wave at a solder application station 38 downstream from the flux application station, is already operational as is the wall 28 of flux. Before any printed circuit board reaches the flux application station the flow rate of the flux into the wall at a position for contacting the undersurface of a board is shown at the lower position 40 of the graph 42 in FIG. 3, i.e. with the drum 12 being rotated at its lowest desired rotational speed. FIG. 3 shows a series of cycles in the flow rate of the flux into the effective part of the wall which will contact the undersurface of each board. The flow rate is constant as indicated by the part of the graph 40 until a first board has its leading end advanced to such a position that the sensor 30 is operated. This is shown by the left-hand station 'A' in FIG. 3. A signal sent from the sensor 30 then instructs the computer 32 to increase the drive speeds of the motors 34 to rotate the drum 12 at its maximum desired speed at which point the flow rate rapidly increases as shown by the upward portion 44 of the graph at the left-hand side of FIG. 3, to a maximum flow rate in the wall at the point of contact with the printed circuit board. The board then progresses through the flux application station during which time the potentiostats 35 are controlled by the computer 32 to progressively decrease the rotational speeds of the motors 34 and thus of the drum 12 in desired manner. The flux flow application rate to the board undersurface then decreases in desired manner as shown by graph portion 46. It should be noted that the leading end of the board enters the wall (position B on the graph) after controlled decrease in rotational speed of drum 12 has commenced. When the trailing end has passed the flux application station (position C in FIG. 3) the flux flow rate continues to decrease as shown by graph portion 46 for a minimum period during controlled progressive rotational speed of the drum 12. The drum speed is then decreased rapidly to provide a rapid decrease in flux flow rate to a second position 40 corresponding to the first position. A succeeding printed circuit board having its leading end operating the sensor (next position A in FIG. 3) then effectively causes the drum to rotate again at its maximum desired speed in order to start a repeat in the flux flow cycle. The cycles are repeated for each board as it passes into and out of the flux application station.

As will be seen from the above description, because the flux is applied in the manner described with a progressive reduction in flux in the wall at the position of application of the flux onto each board, then necessarily the amount of flux applied to the undersurface of the board decreases progressively from the leading end to the trailing end. However, as each printed circuit board proceeds upwardly along the conveyor 12 towards the solder application station, the flux will flow downwardly along the inclined undersurface of the board so that the flux at the upper end portions decreases in thickness and that at the lower end portions increases in thickness. There is a tendency therefore for the flux thickness over the whole board to change towards a constant thickness from one end of the board to the ocher. Bearing this in mind, and knowing the speed and inclination of the conveyor 12 and the characteristics of flow of the flux, a determination may be made on how to control the reduction in flow rate of the flux whereby a substantially constant thickness of flux may be obtained from end to end of the board by the time it reaches the solder application station. It follows therefore than in using the flow control described in the embodiment and according to the invention, upon each printed circuit board reaching the solder application station, the flux on the board is of substantially constant thickness all over the undersurface of the printed circuit board and this thickness is as required for most efficient solder application at the terminal positions.

As may be seen therefore from the first embodiment and falling within the scope of the invention, it is possible to control the thickness of the flux over the whole board area to that which is required upon that board and this process will reduce any tendency for poor quality solder application at the terminal positions. Hence, there is a minimized possibility of any boards not meeting the required quality standards and this results in less percentage scrap in commercial use of the process.

In a second embodiment now to be described, a wave soldering apparatus 100 is constructed similarly to the apparatus 10 of the first embodiment and has the same advantages. In addition, however, and as will become apparent, the apparatus of the second embodiment is capable of correcting any deviation of the flow rate of flux away from its desired flow rate at any instant.

Figure 4:
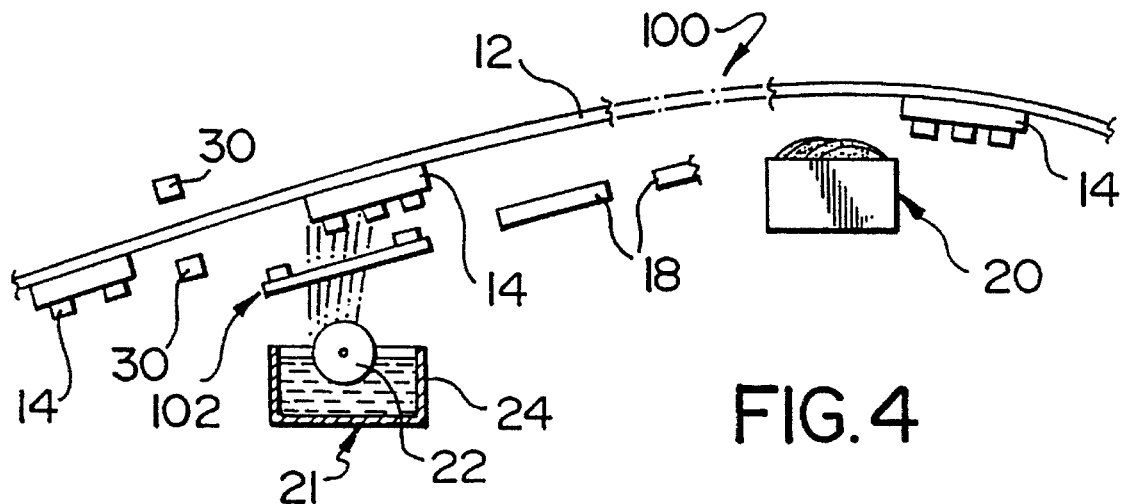
FIG. 4 is a view similar to FIG. 1 of a second embodiment.

In the second embodiment in which parts similar to those in the first embodiment bear the same reference numerals, the apparatus 100 has a monitoring means, designated generally at 102 in FIG. 4, for monitoring the application of flux directed onto printed circuit boards 14 moving along the conveyor 12. The monitoring means, as is more clearly shown in FIG. 5, comprises a rigid rectangular frame 104 defining an opening 106 disposed above the drum 22. The opening 106 is provided for enabling the wall 28 of flux to pass through the opening in order to reach the undersides of the printed circuit boards. The frame 104 provides a means for supporting a means for transmitting and receiving infra red light.

Figure 5:
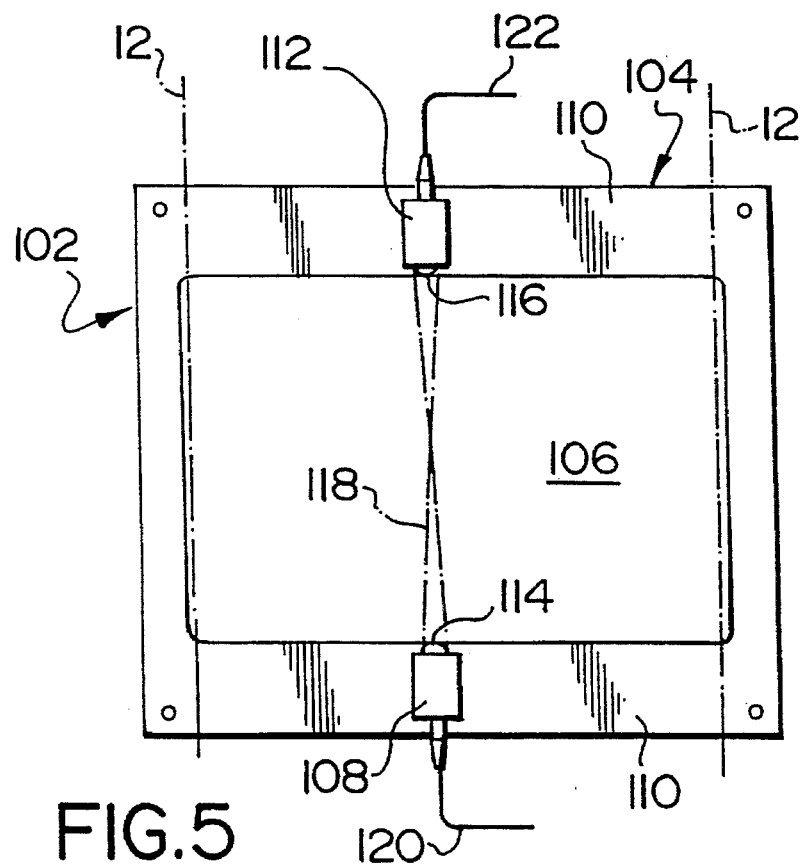
FIG. 5 is a plan view of a monitoring means of the second embodiment and to a larger scale than FIG. 4.

The means for transmitting infrared light comprises a fiber optic launch and lens assembly 108 (for instance as made by Terra Hertz Inc, of Oriskiny, N.Y.) the assembly 108 being located in a fixed position on a beam 110 of the frame 104, the beam 110 extending transversely of the passline for the conveyor 12. The position of the conveyor is shown in FIG. 5 by the chain-dotted conveyor edges. The launch assembly 108 is oriented to direct light rearwardly through the wall of flux, i.e. across the opening 106. The means for receiving the infrared light which has past through the wall of flux and is unabsorbed thereby comprises a receiving assembly 112 which is similar to the launch assembly 108 and is disposed upon another beam 110 on the other side of the opening 106. The assembly 108 is positioned such that it is located with its lens 114 accurately aligned with a lens 116 of the assembly 112. The lens 114 is a focusing lens for focusing the light at a position midway through the wall of flux between the two beams 110, the unabsorbed light then being divergent as it extends towards the corresponding lens 116 on the other side of the wall. The focused light is indicated by reference 118 in FIG. 5. The monitoring means also includes an optic cable 120 for transmitting the infrared light to the assembly 108 and another cable 122 for receiving the light from the assembly 112 on the other beam 110. Only certain optical fiber cables are manufactured which may be used at the present time for transmitting infrared light signals. Such cables incorporate zinc fluoride fibers and are made by Terra Hertz Inc. (referred to above) or alternatively by Galileo Fiber Optics.

Figure 6:
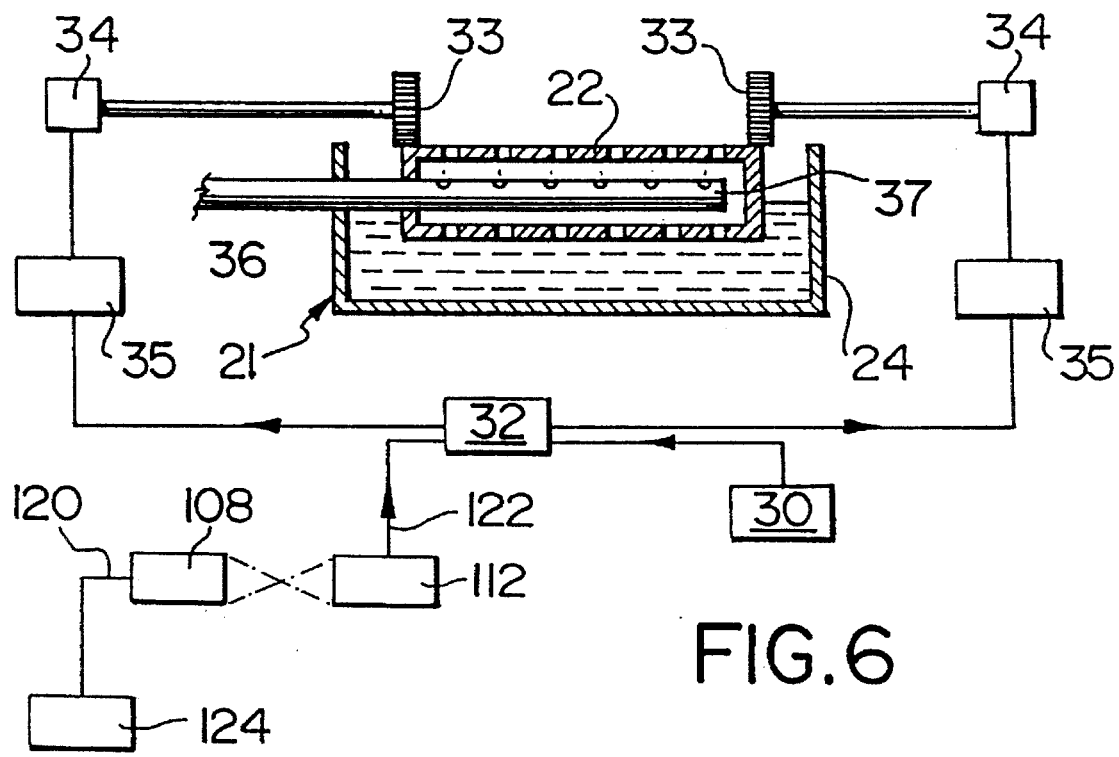
FIG. 6 is a view similar to FIG. 2 of the second embodiment.
Figure 7:
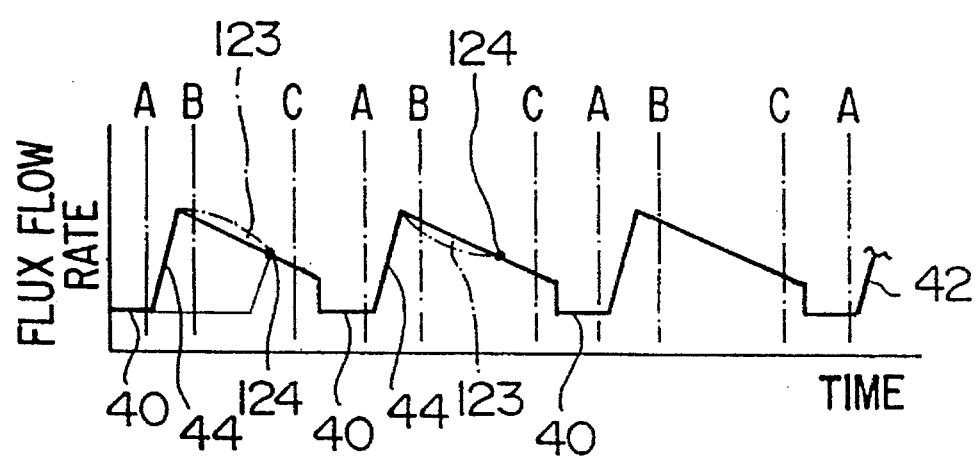
FIG. 7 is a view similar to FIG. 3 of the second embodiment.

As shown by FIG. 6, the optical fiber cable 120 from the assembly 108 commences at a source 124 of infrared light. Signals received by the other assembly 112 are transmitted by cable 122 to the computer 32. In use, signals are sent by the receiving assembly 112 to computer 32 and which indicate the quantity of flux in the wall 28 at a position slightly below the positions of printed circuit boards 14 passing along the conveyor 12. If any of these signals indicates that the flux density at any specific time is below that which is desired for that specific time, then the computer adjusts the speed of motors 34 to rotate the drum 22 at the required speed to adjust the flow rate. Thus, where the actual flow rate as shown in chain-dotted outline 123 in FIG. 7 is not that which is desired, (the desired rate being in full outline in FIG. 7), the flow rate is adjusted so as to move the actual flow rate to the desired rate. This is shown, for instance, by the merging of the chain-dot outline at positions 124 on the curve in FIG. 7. An accurate control is thus provided for the flow rate of the flux in the second embodiment.

What is claimed is:

1. A method of fluxing and soldering terminals on a printed circuit board comprising:

moving the printed circuit board along a passline through a flux application station;

directing a wall of flux across a surface of the board as it moves through the flux application station while decreasing in controlled manner the flow rate of the flux directed at the board surface until the board has passed completely through the wall of flux whereby the thickness of flux upon the board surface decreases from a leading end to a trailing end of the board;

moving the board out of the flux application station in an upwardly inclined manner towards a solder application station thereby causing the flux to flow towards the trailing end of the board to redistribute the flux towards providing a constant flux thickness over the board; and then moving the board through the solder application station to apply solder to the terminals.

2. A method according to claim 1 comprising: providing output signals each indicative of the actual concentration of the flux directed at each board surface at a specific time; and when an output signal is different from a datum signal corresponding to the desired flow concentration at that specific time, modifying change in the flow rate of the flux to adjust succeeding flow concentrations to those desired.

3. A method according to claim 2 comprising passing infrared light having a range of wavelengths, through the wall of flux to cause different wavelengths of the infrared light to be absorbed at least partially by different materials in the flux; and receiving the unabsorbed infrared light which has passed through the wall and generating the output signals corresponding to different wavelengths of unabsorbed light and thus corresponding to the actual flux concentration in the wall.

4. A method of fluxing and soldering terminals on a plurality of printed circuit boards moving in series along a passline through a flux application station and then through a solder application station, the method comprising:

directing a wall of flux against a surface of each board in turn as it moves through the flux application station with a leading end of each board moving into the wall of flux so that the wall of flux is directed along each board from the leading end to a trailing end of each board and while simultaneously decreasing in a controlled manner, from a desired maximum, the flow rate of the flux being applied to each board whereby the thickness of flux upon each board surface decreases from the leading end to the trailing end;

moving each board out of the flux application station and, to complete a flux flow rate cycle, increasing the flow rate of the flux to the desired maximum after each board has moved out of and before a leading end of the next succeeding board moves into the flux application station;

after each board has moved out of the flux application station, moving each board in an upwardly inclined manner towards a solder application station thereby causing the flux to flow towards the trailing end to redistribute the flux towards providing constant flux thickness over each board; and then moving each board through the solder application station to apply solder to the terminals.

5. A method according to claim 4 comprising:

sensing when each board reaches a specific predetermined position during its movement towards the flux application station;

then effecting the maximum desired flow of flux to be directed across the surface of each board at the leading end, the flow then being decreased in the desired manner.

6. A method according to claim 5 comprising decreasing the flow of flux according to a predetermined time factor consistent with each board passing completely through the wall of flux.

7. A method according to claim 6 comprising decreasing the flow rate of flux to zero after each board has passed completely through the wall of flux.

8. A wave soldering apparatus comprising:

a flux application station and a solder application station disposed downstream of the flux application station along a passline for printed circuit boards to be passed through the apparatus;

means for creating a wall of flux in the flux application station and for directing it upwardly towards the passline to coat, with flux, printed circuit boards as they move through the flux application station;

and means for controlling the flow rate of the flux into the wall whereby the flow rate decreases from a desired maximum as a leading end of one of said boards enters the wall until said one of said boards has passed completely through the wall.

9. Apparatus according to claim 8 wherein the means for creating the wall of flux comprises a perforate drum mounted in a bath for containing flux and means for directing pressurized air into the drum to cause the air to flow through perforations in the drum to raise flux off the drum and into the wall, the drum being rotatable by motor means, and the means for controlling the flow rate of the flux into the wall comprises means for controlling the speed of operation of the motor means, a computer control for operating the control means, and a sensing means, the sensing means operable when the leading end reaches a specific position before the flux application station, to transmit a signal to the computer to operate the control means to effect rotation of the drum at a maximum desired speed consistent with the maximum flux flow rate, the computer then being further operable to reduce the rotational speed of the drum in a controlled manner.

10. Apparatus according to claim 8 comprising means for producing signals each indicative of actual concentrations of flux directed at a surface of said one of said boards at a specific time, the means for controlling the flow rate of the flux being operable, upon a produced signal differing from a datum corresponding to the desired flux concentration at that specific time, to modify the rate of change in the flow rate of the flux to adjust succeeding flow concentrations to those desired.

11. Apparatus according to claim 8 comprising means for directing infrared light through the wall of flux and the means for producing the signals comprises means for receiving infrared light which is unabsorbed by the materials of the flux in the wall and which has passed through the wall.

* * * * *